United States Patent
Epple

(10) Patent No.: US 11,738,640 B2
(45) Date of Patent: Aug. 29, 2023

(54) MOTOR VEHICLE TRANSMISSION WITH A POWER TAKE-OFF

(71) Applicant: ZF Friedrichshafen AG, Friedrichshafen (DE)

(72) Inventor: Michael Epple, Bad Waldsee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 102 days.

(21) Appl. No.: 17/111,826

(22) Filed: Dec. 4, 2020

(65) Prior Publication Data
US 2021/0170866 A1 Jun. 10, 2021

(30) Foreign Application Priority Data
Dec. 6, 2019 (DE) .................. 10 2019 219 046.4

(51) Int. Cl.
| | |
|---|---|
| *B60K 17/28* | (2006.01) |
| *B60K 17/02* | (2006.01) |
| *B60K 17/10* | (2006.01) |
| *F16H 45/02* | (2006.01) |
| *F16H 61/00* | (2006.01) |
| *F16H 57/021* | (2012.01) |
| *B60K 25/06* | (2006.01) |

(52) U.S. Cl.
CPC .............. *B60K 17/28* (2013.01); *B60K 17/02* (2013.01); *B60K 17/10* (2013.01); *F16H 45/02* (2013.01); *F16H 61/0025* (2013.01); *B60K 25/06* (2013.01)

(58) Field of Classification Search
CPC ........ B60K 17/02; B60K 17/10; B60K 17/28; B60K 25/06; B60K 17/08; F16H 45/02; F16H 61/0025; F16H 57/021; F16H 2200/0004; B60Y 2400/795
See application file for complete search history.

(56) References Cited

U.S. PATENT DOCUMENTS

| | | | | |
|---|---|---|---|---|
| 5,199,317 | A | * | 4/1993 | Moore ................ F16H 57/0434 184/6.12 |
| 7,765,884 | B2 | | 8/2010 | Frait et al. |
| 7,789,792 | B2 | | 9/2010 | Kamm et al. |
| 9,067,492 | B2 | * | 6/2015 | Hairston ................. F16F 15/12 |
| 9,783,049 | B2 | * | 10/2017 | Frait ...................... B60K 17/02 |
| 2016/0208895 | A1 | * | 7/2016 | Uchino ................ F16H 57/021 |
| 2019/0193560 | A1 | | 6/2019 | Trübenbach et al. |

FOREIGN PATENT DOCUMENTS

| | | | |
|---|---|---|---|
| DE | 10 2005 002 337 A1 | 8/2006 | |
| DE | 10 2008 033 434 A1 | 4/2009 | |
| DE | 10 2016 212 209 A1 | 1/2018 | |
| JP | S6280068 U * | 5/1987 | ............. B60K 17/28 |

* cited by examiner

*Primary Examiner* — Tinh Dang
(74) *Attorney, Agent, or Firm* — Finch & Maloney PLLC

(57) ABSTRACT

A motor vehicle transmission that includes an input shaft (AN), an output shaft (AB), a power take-off (1) and a first intermediate wall (5). The power take-off (1) has a power take-off gearwheel (1A). The power take-off gearwheel (1A) is arranged coaxially with the input shaft (AN) and is rotatably supported by the first intermediate wall (5).

9 Claims, 2 Drawing Sheets

MOTOR VEHICLE TRANSMISSION WITH A POWER TAKE-OFF

This application claims priority from German patent application serial no. 10 2019 219 046.4 filed Dec. 6, 2019.

FIELD OF THE INVENTION

The invention relates to a motor vehicle transmission with a power take-off.

BACKGROUND OF THE INVENTION

Motor vehicle transmissions with power take-offs are already known as such, for example from DE 10 2016 212 209 A1 or DE 10 2008 033 434 A1.

In DE 10 2016 212 209 A1 a PTO gearwheel is supported by a bearing and can rotate on a stator shaft. Furthermore, a pump support in the form of an intermediate wall is provided.

Power take-offs are available in drive-dependent, clutch-dependent or motor-dependent versions. Drive-dependent power take-offs, for example, supply the hydraulic system of dual-circuit steering systems with working pressure, so that rolling vehicles can still be steered when the primary system has failed due to an engine failure. Clutch-dependent power take-offs are suitable for short-time or long-lasting operation while driving or at rest. Motor-dependent power take-offs differ from clutch-dependent power take-offs in that in the case of motor-dependent power take-offs there is a direct connection to the driveshaft (as a rule the crankshaft) of the drive motor of the vehicle, which bypasses the vehicle clutch or the torque converter, so that such power take-offs are permanently connected mechanically to the driveshaft. Typical fields of use for power take-offs are auxiliary aggregates which are to be powered by a motor vehicle, such as high-pressure pumps for fire-engines, canal high-pressure flushing and suction vehicles, earth augers, concrete mixers and concrete pumps.

SUMMARY OF THE INVENTION

The purpose of the present invention is to improve upon the prior art.

This objective is achieved by the measures indicated in the principal claim. Preferred embodiments thereof emerge from the subordinate claims.

According to these, a motor vehicle transmission having an input shaft, an output shaft, a power take-off and a (first) intermediate wall is proposed. The power take-off provides a further drive output on the transmission, in order to be able to drive units external to the transmission. The power take-off comprises a power take-off gearwheel for transmitting force. The power take-off gearwheel is arranged coaxially with the input shaft and is supported rotatably.

In this case the power take-off gearwheel is supported rotatably by the (first) intermediate wall. In particular, here the support is radial. In this way, therefore, the power take-off gearwheel is mounted and can rotate on the intermediate wall. Thus, the power take-off gearwheel can be accurately orientated relative to the other force-transmitting means of the power take-off. This improves the running behavior of the power take-off gearwheel. Wear and/or noise during running can be reduced thereby.

The input shaft of the motor vehicle transmission serves to introduce a drive input torque into the transmission itself. The drive input torque is produced by a drive motor and is transmitted by way of the driveshaft of the motor to the input shaft. Correspondingly, the input shaft is designed in particular to be drive-connected to the drive motor. Typically, the drive motor is in the form of an internal combustion engine or an electric motor. A drive aggregate for driving the input shaft can comprise both an internal combustion engine and an electric motor.

The output shaft serves primarily for delivering the drive input torque, modified by the transmission, from the transmission. In that way an appropriately increased or reduced drive torque can be provided for drive wheels or caterpillar tracks of the motor vehicle. Accordingly, the input shaft is in particular designed to be drive-connected to a connection shaft leading to the drive wheels or caterpillar tracks of the motor vehicle. As is known, during overdrive operation this force flow can be reversed.

The power take-off has in particular a power take-off shaft. To that, the aggregate to be driven by it can be coupled. Thus, the power take-off shaft is also designed for coupling to an external aggregate intended to be powered by the power take-off shaft. For example, for that purpose the power take-off shaft has an appropriate connecting flange. In particular, the power take-off shaft extends laterally out of the transmission housing. The power take-off shaft can extend parallel and laterally offset relative to the input shaft and/or the output shaft. The power take-off can have a driven gear ratio step between the power take-off shaft and the input shaft. In what follows, the means of the power take-off for transmitting force from the power take-off gearwheel to the power take-off shaft will also be called the force-transmission means of the power take-off. These may for example consist of a gearwheel transmission means or a chain-drive transmission means. The power take-off gearwheel serves to transmit the drive force tapped off by the power take-off, and is therefore itself a component of the force-transmission means of the power take-off.

Preferably, the (first) intermediate wall has a tubular projection. The power take-off gearwheel is then supported rotatably on the projection by means of a radial bearing arranged on the projection. In that way the power take-off gearwheel can be guided precisely and with little wear by means of the intermediate wall. The projection extends in particular coaxially with the input shaft and with the power take-off gearwheel. The projection can be made more rigid relative to the rest of the intermediate wall by means of ribs. The projection can support an inner ring of the radial bearing, on which roller bodies of the radial bearing are arranged and can rotate. The roller bodies can run in an outer ring of the radial bearing which is arranged on the power take-off gearwheel. Alternatively, the roller bodies can run directly against the power take-off gearwheel. For this, the power take-off gearwheel has an internal running surface for the roller bodies. The outer ring can then be omitted. The radial bearing is in particular a pure radial bearing, i.e. it does not support any axial forces. Thus, a very high load-bearing capacity can be achieved while little space is required. In particular, the radial bearing is in the form of a needle bearing or a cylindrical roller bearing.

Preferably, the (first) intermediate wall supports the power take-off gearwheel axially in the direction of the intermediate wall. Thus, the intermediate wall supports the power take-off gearwheel not only radially but also at least in part axially. In that way it supports the axial forces of the power take-off gearwheel that act in the direction of the intermediate wall. In particular, that happens by virtue of a (first) axial bearing, which is designed in accordance with the level of the axial forces occurring during operation.

Preferably, a thrust washer or an axial roller bearing is arranged between the (first) intermediate wall and the power take-off gearwheel, for example between axially adjacent flat areas or end faces of the intermediate wall and the power take-off gearwheel. The thrust washer or axial roller bearing is responsible for the axial supporting of the power take-off gearwheel in the direction of the (first) intermediate wall. The thrust washer is in particular a plastic or steel washer. Preferably, the thrust washer is inserted when only small axial forces are exerted by the power take-off gearwheel in the direction of the intermediate wall. In contrast, when larger axial forces are exerted by the power take-off gearwheel toward the intermediate wall, the axial roller bearing is used.

In particular, the power take-off gearwheel has straight teeth or helical teeth. When a thrust washer is used between the (first) intermediate wall and the power take-off gearwheel, the obliqueness of the helical teeth is preferably chosen such that when the power take-off gearwheel is rotating in its usual direction during operation, the axial tooth forces are directed away from the (first) intermediate wall. The axial tooth forces generated by the helical teeth are thus hardly at all applied against the thrust washer. This minimizes the axial forces acting upon the thrust washer. In contrast, when the axial roller bearing is used between the (first) intermediate wall and the power take-off gearwheel, the obliqueness of the helical teeth is preferably chosen such that when the power take-off gearwheel is rotating in its usual direction during operation the axial tooth forces are directed toward the (first) intermediate wall. The axial tooth forces generated by the helical teeth are thus almost fully applied against the axial roller bearing. This maximizes the axial forces acting upon the axial roller bearing.

By using an axial roller bearing on one side of the power take-off gearwheel and a thrust washer on the opposite side thereof for its axial support, abrasive wear of the components in direct contact therewith is reduced. The result is a longer service life and higher load-bearing capacity of the gearwheel in both load-bearing and load-free operation. The power take-off gearwheel on the first intermediate wall is preferably supported radially between the two axial bearings. The radial roller bearing for the radial support of the power take-off gearwheel is therefore arranged axially between the two axial bearings. In that way the power take-off gearwheel is mounted simply and in a statically determined position.

In addition to the (first) intermediate wall the motor vehicle transmission also comprises a second intermediate wall. In that case the power take-off is in particular arranged between the first intermediate wall and the second intermediate wall. Thus, by virtue of the two intermediate walls a power take-off space for the power take-off can be formed inside the transmission housing.

The second intermediate wall preferably supports the power take-off gearwheel axially in the direction of the second intermediate wall. Thus, the second intermediate wall supports the axial forces of the power take-off gearwheel that act in the direction of the second intermediate wall. This takes place by virtue of a (second) axial bearing. This axial bearing too can be designed in accordance with the level of the axial forces occurring during operation, as an axial roller bearing or a thrust washer, for example a plastic washer or a steel washer. Accordingly, as a (second) axial bearing the axial roller bearing or the thrust washer can be arranged between the second intermediate wall and the power take-off gearwheel, for example between axially adjacent flat areas or end faces on the second intermediate wall and the gearwheel.

Thus, preferably both a first axial bearing is provided in order to support axial forces of the power take-off gearwheel against the first intermediate wall, and a second axial bearing is provided to support axial forces of the power take-off gearwheel against the second intermediate wall. In that way the gearwheel is fitted in a floating manner between the two intermediate walls. Which of the two sides of the power take-off gearwheel the thrust washer on the one hand and the axial bearing on the other hand are positioned on, depends in particular on the direction of the axial tooth forces that occur during operation. Preferably the axial bearing on the side of the first intermediate wall is in the form of a thrust washer whereas the axial bearing on the side of the second intermediate wall is a roller bearing.

Preferably, the vehicle transmission comprises a hydrodynamic torque converter on the input side. On the drive input side the converter comprises a pump wheel and a turbine wheel. The turbine wheel is connected to the input shaft in order to drive the input shaft. Thus, the input shaft is coupled to the converter on the drive output side of the latter, so that the input shaft is driven by the turbine wheel. In that way a higher torque can be delivered to the input shaft. The pump wheel is preferably connected to the power take-off gearwheel for driving the power take-off gearwheel. Thus, the power take-off gearwheel is driven by the pump wheel. Accordingly, the power take-off gearwheel is coupled to the pump wheel in a rotationally fixed manner. The power take-off is then designed as a motor-dependent power take-off. Thus, the rotational speed of the pump wheel is the same as the rotational speed of the power take-off. Force transmission therefore takes place from the pump shaft via the power take-off gearwheel, to the power take-off shaft. By virtue of the converter the motor vehicle can start off without wear.

Preferably, a hydraulic pump is provided for supplying working pressure to the transmission of the motor vehicle. In particular, by means of the hydraulic pump shifting elements in the transmission are actuated hydraulically. The hydraulic pump is in particular accommodated inside the transmission. Thus, the pump is part of the transmission. The power take-off gearwheel is connected to the hydraulic pump in order to power the hydraulic pump. Thus, the hydraulic pump is driven by the power take-off gearwheel. Force is therefore transmitted to the drive input of the hydraulic pump via the power take-off gearwheel. In this way the drive output to the pump is integrated in the power take-off gearwheel. Thus, the power take-off gearwheel fulfills a double function: on the one hand it serves to transmit the force from the power take-off and on the other hand it serves to transmit power to the pump. For example, a running gear or chain sprockets or some other possibility for driving the pump (such as a pin connection, a key connection, a press-fit for a pump wheel, etc.) can be provided. In another possible design, the pump wheel can be driven directly by the power take-off gearwheel. Thus, the drive input of the hydraulic pump is simple to design.

Preferably, the power take-off gearwheel has a first set of teeth for driving the power take-off and a second set of teeth for powering the hydraulic pump. Thus, force is transmitted to the power take-off shaft via the first teeth. By way of the second teeth force is transmitted to the hydraulic pump, in particular to a rotatable pump rotor of the hydraulic pump. In that way the number of components needed for driving the power take-off and the pump can be minimized. In particular, the two sets of teeth are made integrally with the power take-off gearwheel. An axial distance can be provided between the sets of teeth. This facilitates the production of the teeth from a common workpiece.

The first and second teeth of the power take-off gearwheel are preferably of different design. In that way the transfer of force to the hydraulic pump and to the power take-off shaft can take place in different ways. For example, it can take place on the one hand by means of a gearteeth transmission and on the other hand by a chain drive transmission. Consequently, one set of teeth can be designed to mesh with a gearwheel and the other set of teeth can be designed to mesh with chain links.

Alternatively to the first and second sets of teeth, the power take-off gearwheel can also have a common set of teeth. This then serves on the one hand for the power take-off and on the other hand for the hydraulic pump. Thus, the power take-off and the hydraulic pump are driven by the common teeth, for example by gearwheels which both engage in the common teeth. A gearwheel for the power take-off then meshes with the common teeth at one point and a gearwheel for the hydraulic pump meshes with the common teeth at another point.

The transmission of the motor vehicle is preferably designed as a multi-step transmission. It then comprises a plurality of gear ratio steps (gears) that can be engaged as selected. In particular it comprises a plurality of forward gears and at least one reverse gear. In particular it is designed as an automated change-speed transmission or automatic transmission. In a particularly preferred embodiment it is in the form of a multi-step transmission according to FIG. 4 of DE 10 2005 002 337 A1.

Preferably, the motor vehicle transmission comprises the aforesaid transmission housing. The first and/or second intermediate wall serves in particular to separate spatially two spaces within the transmission housing. The transmission housing screens those spaces from external environmental conditions, in particular such as rain, dust, spray, etc. The first and/or second intermediate wall can be in the form of intermediate plates. The intermediate plate is in particular designed to be inserted axially into the transmission housing. The intermediate plate can be designed to be screwed onto the transmission housing. The first and/or second intermediate wall serves in particular to support one or more pistons (in particular hydraulic pistons) for the actuation in each case of a transmission shifting element, and/or to support shafts of the transmission and/or to guide hydraulic fluid. In particular, the turbine wheel of the torque converter is supported radially by the second intermediate wall.

Preferably, the aforesaid hydraulic pump that serves to supply the transmission with a hydraulic working pressure is supported by the first or second intermediate wall. For example, the pump is screwed firmly to it. The pump, or at least essential parts of the pump, in particular the pump housing, can also be let into or integrated in the intermediate wall. Ducts for conveying hydraulic fluid into and/or from the pump can be arranged in the intermediate wall.

In a particularly preferred embodiment, the first intermediate wall is designed to spatially separate an inside space of the transmission from a power take-off space of the transmission. In this case the inside space of the transmission contains the gearwheels of the transmission for transmitting force between the input shaft and the output shaft of the transmission. Thus the gearwheels serve, together with the transmission shifting elements also accommodated therein, for the essential function of the transmission, in particular such as the engagement of gear ratios. In contrast, the force-transmission means of the power take-off with the power take-off gearwheel are accommodated in the power take-off space. As already explained, these force-transmission means transfer the drive power branched off by the power take-off to the output of the power take-off, i.e. in particular to the power take-off shaft. The inside space of the transmission is spatially separated from the power take-off space by the first intermediate wall. Thus, by virtue of this first intermediate wall there is a constructively clear functional separation of the power take-off from the rest of the transmission. In that way, for example, fault diagnoses and repair work are simplified. The second intermediate wall is then designed to spatially separate the power take-off space from the inside space of a clutch bell. In the inside space of the clutch bell is arranged a starting clutch for the motor vehicle transmission. The starting clutch is in particular the torque converter. The second intermediate wall separates the normally dry inside space of the clutch bell from the normally oil-lubricated power take-off space.

The proposed motor vehicle transmission is in particular part of a motor vehicle drive-train. Besides the proposed transmission the drive-train can also comprise the drive motor and/or the connecting shafts for passing on the drive power to the drive wheels or caterpillar tracks of the motor vehicle. In particular, the motor vehicle is a passenger car or a truck or a powered bus, for which the motor vehicle transmission is correspondingly designed. Thus, a motor vehicle drive-train and a motor vehicle each comprising the proposed transmission are also proposed.

BRIEF DESCRIPTION OF THE DRAWINGS

Below, the invention is explained in greater detail with reference to figures from which further preferred embodiments of the invention can emerge. These show, in each case schematically.

DETAILED DESCRIPTION OF THE PREFERRED EMBODIMENTS

In the figures, the same or at least functionally equivalent components are given the same indexes.

The motor vehicle transmission shown in each figure is in the form of a multi-step transmission. Thus, it has a plurality of gear ratios that can be engaged.

Figure 1:
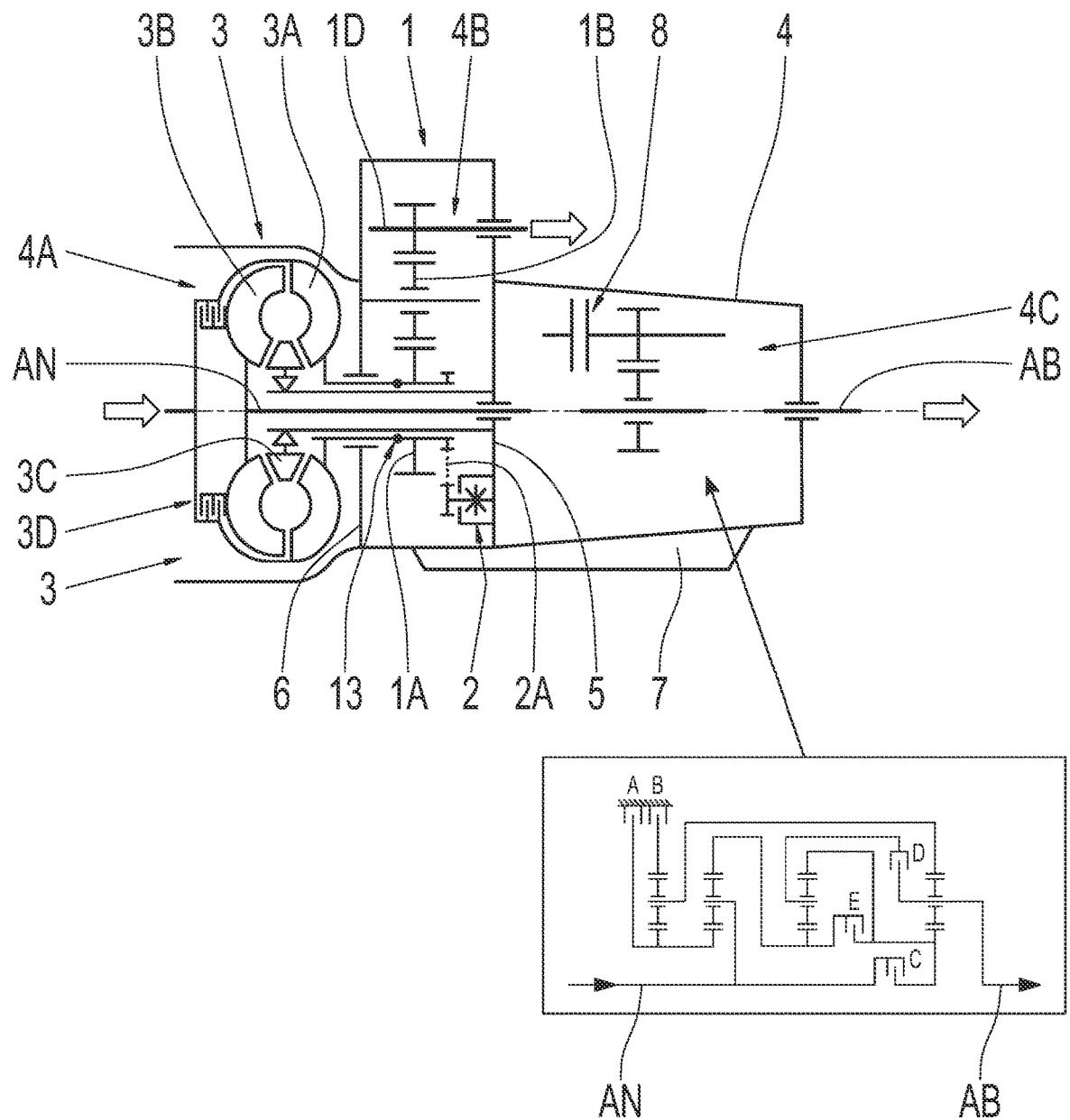
FIG. 1: A longitudinal section through a vehicle transmission.

In the upper part of the transmission shown in FIG. 1, a power take-off 1 of the transmission with the associated power take-off gearwheel 1A is shown, as an example. The lower part shows as an example the mechanical coupling of a hydraulic pump 2 of the transmission with a torque converter 3 arranged on the input side of the transmission.

The transmission has a transmission housing 4. Inside the transmission housing, the spaces 4A, 4B, 4C spatially separated by intermediate walls 5, 6 are formed. These are an inside space 4A of a clutch bell housing of the transmission, within which the converter 3 is arranged (the converter being a starting clutch 3), a power take-off space 4B in which the force-transmitting means of the power take-off 1 are arranged, and an inside space 4C of the transmission in which the essential elements for the various gear ratio steps of the motor vehicle transmission are arranged, i.e. the actual transmission itself. These spaces 4A, 4B, 4C are spatially separated from one another by the intermediate walls 5, 6.

The torque converter 3 is of conventional design. It consists essentially of the pump wheel 3A on the drive input side and the turbine wheel 3B driven hydrodynamically by it on the drive output side. In addition a stator wheel 3C can be provided. Between the pump wheel 3A and the turbine wheel 3B a bridging clutch 3D may be provided. The pump wheel 3B is coupled to a drive motor (not shown) in order to be driven by it. This is indicated by the arrow shown adjacent thereto. Thus, the rotational speed of the drive motor corresponds to the rotational speed of the pump wheel 3B. The drive motor and thus also the pump wheel 3B have a specified, usual rotational direction envisaged.

The pump wheel 3A is mechanically coupled to the hydraulic pump 2, so that the pump 2 is powered by the pump wheel 3A. This coupling takes place indirectly by way of the power take-off gearwheel 1A. The force transfer from the power take-off gearwheel 1A to the hydraulic pump 2 then takes place by gearwheel transmission and/or chain transmission. For example, FIG. 1 shows force transfer by way of a link chain 2A. The hydraulic pump 2 is arranged within the intermediate wall 5. For that purpose the associated pump housing is let into it or forms part of the intermediate wall 5. Thus, the intermediate wall supports the hydraulic pump 2.

The turbine wheel 3B is coupled to an input shaft AN of the transmission in order to drive the input shaft AN. Thus, the rotational speed of the turbine wheel 3B corresponds to the rotational speed of the input shaft AN. The input shaft AN extends through the power take-off space 4B into the inside space 4C of the transmission. In the power take-off space 4B, the power take-off gearwheel 1A is mounted to rotate coaxially with the input shaft AN.

The power take-off gearwheel 1A is drive-coupled to a power take-off shaft 1D. This can be done, for example, by a gearwheel transmission and/or by a chain drive. As an example FIG. 1 shows a gearwheel transfer mode by way of an intermediate wheel 1B. The power take-off shaft 1D extends out of the transmission housing 4 and thus the power take-off space 4B. It extends parallel and laterally offset relative to the input shaft AN and the output shaft AB of the transmission. Thus, external auxiliary aggregates can be connected to the power take-off shaft 1D and can be powered by it. So, drive power tapped off from the pump wheel 3A can be drawn by way of the power take-off shaft 1D of the power take-off 1. This is indicated by the arrow shown adjacent to the power take-off shaft 1D.

The transmission transfers the drive power applied at the input shaft AN to the output shaft AB. This is indicated by the arrow shown adjacent to the output shaft AB. The output shaft AB, for example, is coupled via connecting shafts to drive wheels of the associated motor vehicle in order thereby to propel the motor vehicle.

The transmission shifting elements 8 that are in the inside space 4C of the transmission can be actuated by a transmission control unit 7, as well as gearwheels and transmission shafts, for the purpose of engaging and disengaging the various gear ratio steps as necessary. Thus, the transmission elements required for the primary function of the transmission are accommodated in the inside space 4C of the transmission. These elements can be designed and arranged relative to one another in already familiar ways. Preferably, they are made and arranged relative to one another in accordance with FIG. 4 of DE 10 2005 002 337 A1. For more details, therefore, explicit reference should be made to the relevant explanations in DE 10 2005 002 337 A1.

The transmission shown in FIG. 4 of DE 10 2005 002 337 A1 is incorporated in the present FIG. 1 at bottom left. In that, the transmission shifting elements are denoted A, B, C, D and E. The arrow indicates that in the proposed motor vehicle transmission this is preferably but not imperatively used.

In the present case the power take-off gearwheel 1A is rotatably supported radially and axially in the transmission housing 4. The power take-off gearwheel 1A is supported radially on the first intermediate wall 5 by means of a radial bearing arranged on it. The axial support preferably takes place on one side of the first intermediate wall 5 by means of a first axial bearing arranged on it, and on the other side, on the second intermediate wall 6 by means of a second axial bearing arranged on it. In FIG. 1 these bearings are not shown for the sake of simplicity.

Figure 2:
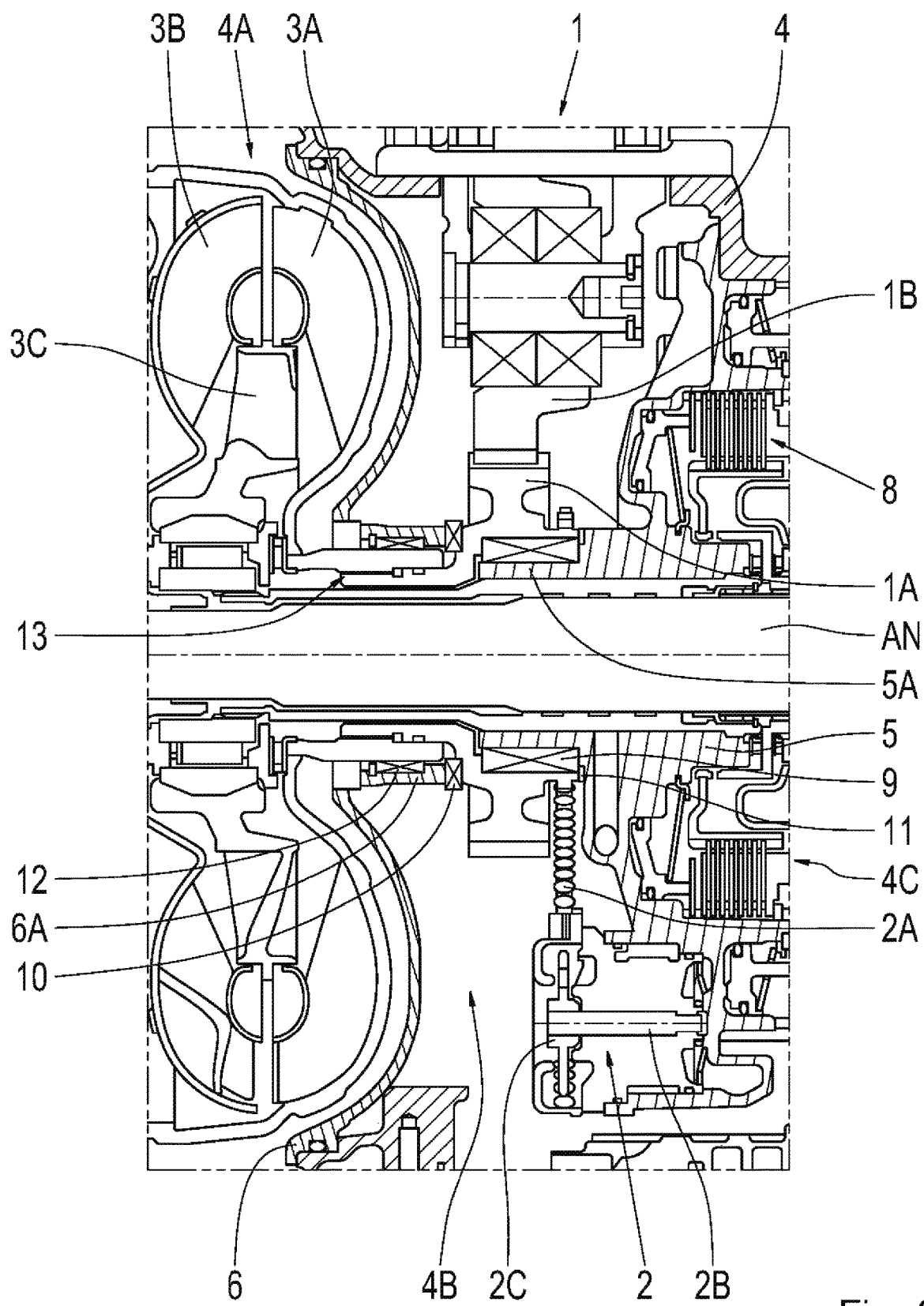
FIG. 2: Part of a more detailed longitudinal section through a motor vehicle transmission.

A preferred design of the mounting system is shown in FIG. 2. FIG. 2 shows part of a longitudinal section through a motor vehicle transmission according to FIG. 1, in the area of a power take-off 1 of the transmission.

According to FIG. 2 the mounting of the power take-off gearwheel 1A comprises a radial roller bearing 9 and an axial roller bearing 10 and a thrust washer 11. The radial roller bearing 9 is in the form of a needle bearing or a cylindrical roller bearing. It is fitted on a tubular projection 5A of the first intermediate wall 5. The axial roller bearing 10 is arranged between a shoulder of the power take-off gearwheel 1A and an end face of a tubular projection 6A of the second intermediate wall 6. The thrust washer 11 is arranged axially between another shoulder of the power take-off gearwheel 1A and a shoulder of the projection 5A of the first intermediate wall 5.

The gearteeth of the power take-off gearwheel 1A used for the power take-off 1 are in the form of helical teeth. Thus, during operation axial tooth forces act upon the power take-off gearwheel 1A. When the power take-off gearwheel 1A is rotating in its usual direction these forces act in the direction toward the second intermediate wall 6. Thus, the axial roller bearing 10 is positioned there in order to support these relatively large axial forces against the second intermediate wall 6. No axial forces, or hardly any, act toward the first intermediate wall 5. Thus it suffices to position the thrust washer 11 there. Since the loading of the thrust washer 11 is particularly low, it can even be made of plastic.

The two intermediate walls 5, 6 are each made as separate intermediate plates. The intermediate plates are inserted axially into the transmission housing and fixed therein by screws. In the assembled condition the intermediate plates make the transmission more rigid and form part of the transmission housing 4.

In the present case the hydraulic pump 2 is also connected to the power take-off gearwheel 1A in order to drive the hydraulic pump 2, as already explained earlier. For that purpose the power take-off gearwheel 1A has first teeth for the power take-off and second teeth for driving the hydraulic pump.

According to FIG. 2 the teeth of the power take-off gearwheel 1A used for the power take-off mesh with the rotationally mounted intermediate wheel 1B of the power take-off 1. Axially adjacent to these first teeth the power take-off gearwheel 1A has second teeth. Compared with the first teeth the second set of teeth has a smaller pitch circle diameter. The second teeth mesh with a link chain 2A for driving the hydraulic pump 2. Thus, the second teeth form chain sprockets. The pump 2 is let into the first intermediate wall 5, which supports it. Thus, the second teeth are closer to the intermediate wall 5 than are the first teeth. On the pump side the link chain 2A meshes with a chain wheel 2C on a rotatable pump shaft 2B of the pump 2. Thus, the pump 2 is necessarily coupled to the power take-off gearwheel 1A and is rotationally driven when the power take-off gearwheel 1A rotates. The pump 2 can for example be in the form of an internal gearwheel pump.

Thus, the intermediate wall 5 supports both the pump 2 and the power take-off gearwheel 1A. Consequently, no radial forces occur due to driving the pump outside the intermediate wall 5.

In the area of the second intermediate wall 6, the power take-off gearwheel 1A is coupled to the pump wheel 3A by a coupling point 13. This coupling point 13 is for example in the form of an interlocking shaft-hub connection of the pump wheel 3A and the power take-off gearwheel 1A. In particular it is in the form of a spline or splined shaft. Thus, at that point 13 the pump wheel 3A engages in a corresponding entrainment feature of the power take-off gearwheel 1A. In this case the coupling point 13 is radially inside the tubular projection 6A of the second intermediate wall 6.

The projection 6A of the second intermediate wall 6 also serves for the radial support of the pump wheel 3A. For this a further radial roller bearing 12 is provided, which is arranged radially between the pump wheel 3A and the projection 6A. The projection 6A can be made more rigid with the rest of the intermediate wall 6 by means of ribs. The same applies to the projection 5A and the intermediate wall 5.

The power take-off gearwheel 1A has on one side a toothed section with the two sets of teeth for transmitting force to the power take-off 1 and to the pump 2, and on the other side a coupling section for coupling to the pump wheel 3A at the point 13. The coupling point 13 can be arranged radially inside the radial bearing 12. In that way the coupling point 13 can be accommodated in a space-saving manner. The axial roller bearing 10 is arranged on the shoulder of the power take-off gearwheel 1A formed by the tapering between the coupling section and the toothed section thereof.

According to FIG. 2, the power take-off gearwheel 1A is made integrally, in one piece. Thus, the power take-off gearwheel 1A is made from a single workpiece, from which the two sets of teeth are machined. The connection elements of the power take-off gearwheel 1A for the coupling point 13 can also be appropriately made from the same blank.

INDEXES

1 Power take-off
1A Power take-off gearwheel
1B Intermediate wheel
1D Power take-off shaft
2 Hydraulic pump
2A Link chain
2B Pump wheel
2C Chain wheel
3 Torque converter
3A Pump wheel
3B Turbine wheel
3C Stator wheel
3D Bridging clutch
4 Transmission housing
4A Inside space, torque converter space
4B Inside space, power take-off space
4C Inside space, transmission inside space
5 Intermediate wall
6 Intermediate wall
7 Transmission control unit
8 Transmission shifting element
9 Radial bearing
10 Axial bearing
11 Axial bearing, thrust washer
12 Radial bearing
13 Coupling point
A . . . E Transmission shifting element
AN Input shaft
AB Output shaft

The invention claimed is:

1. A motor vehicle transmission comprising:
an input shaft,
an output shaft,
a power take-off, and
a first intermediate wall of the power take-off,
the power take-off comprising a power take-off gearwheel,
the power take-off gearwheel being arranged concentrically with the input shaft and being rotationally supported,
wherein the power take-off gearwheel is rotationally supported by the first intermediate wall,
the first intermediate wall has an axially extending tubular projection, and
the power take-off gearwheel is rotationally supported on the tubular projection by a radial roller bearing that is arranged radially between the take-off gearwheel and the tubular projection of the first intermediate wall, and the first intermediate wall being arranged on one axial side of the power take-off gearwheel,
a second intermediate wall being arranged on an axial side of the power take-off gearwheel opposite from the first intermediate wall, the second intermediate wall axially supports the power take-off gearwheel in a direction of the second intermediate wall, and
either a thrust washer or an axial roller bearing is arranged axially between the second intermediate wall and the power take-off gearwheel.

2. The motor vehicle transmission according to claim 1, wherein the first intermediate wall axially supports the power take-off gearwheel in a direction of the first intermediate wall.

3. The motor vehicle transmission according to claim 1, further comprising a hydrodynamic torque converter disposed on an input side,
the torque converter comprises a pump wheel and a turbine wheel,
the turbine wheel is connected to the input shaft for driving the input shaft, and
the pump wheel is connected to the power take-off gearwheel for driving the power take-off gearwheel.

4. The motor vehicle transmission according to claim 1, further comprising a hydraulic pump, and the hydraulic pump serves to supply the motor vehicle transmission with hydraulic working pressure, and
the power take-off gearwheel is connected to a drive input of the hydraulic pump for driving the hydraulic pump.

5. The motor vehicle transmission according to claim 3, wherein the power take-off gearwheel has a first set of teeth for the power take-off and a second set of teeth for a hydraulic pump.

6. The motor vehicle transmission according to claim 3, wherein the power take-off gearwheel has a common set of teeth for the power take-off and for a hydraulic pump.

7. A motor vehicle transmission comprising:
an input shaft,
an output shaft,
a power take-off, and a first intermediate wall of the power take-off, the power take-off comprising a power take-off gearwheel that is arranged concentrically with the input shaft and is rotationally supported on the first intermediate wall, and a thrust washer is axially arranged between the first intermediate wall and the power take-off gearwheel such that the power take-off gearwheel is axially supported by the first intermediate wall, and the first intermediate wall being arranged on one axial side of the power take-off gearwheel, a second intermediate wall being arranged on an axial side of the power take-off gearwheel opposite from the first intermediate wall, the second intermediate wall axially supports the power take-off gearwheel in a direction of the second intermediate wall, and either a thrust washer or an axial roller bearing is arranged axially between the second intermediate wall and the power take-off gearwheel.

8. A motor vehicle transmission comprising:

an input shaft, an output shaft, a power take-off, and a first intermediate wall of the power take-off, the power take-off comprising a power take-off gearwheel, the power take-off gearwheel being arranged concentrically with the input shaft and being rotationally supported by the first intermediate wall, and the first intermediate wall being arranged on one axial side of the power take-off gearwheel, a second intermediate wall being arranged on an axial side of the power take-off gearwheel opposite from the first intermediate wall, the second intermediate wall axially supports the power take-off gearwheel in a direction of the second intermediate wall, and either a thrust washer or an axial roller bearing is arranged axially between the second intermediate wall and the power take-off gearwheel.

9. The motor vehicle transmission according to claim 8, further comprising a transmission inside space, a power take-off space, and a clutch bell, gearwheels, for force transmission between the input shaft and the output shaft, are arranged in the transmission inside space, force-transmission means of the power take-off with the power take-off gearwheel are arranged in the power take-off space, a starting clutch for the motor vehicle transmission is arranged in an inside space of the clutch bell, the first intermediate wall spatially separates the transmission inside space from the power take-off space, and the second intermediate wall spatially separates the inside space of the clutch bell from the power take-off space.

\* \* \* \* \*